United States Patent
Miller

(10) Patent No.: US 11,896,002 B2
(45) Date of Patent: Feb. 13, 2024

(54) SYSTEMS AND METHODS FOR SCHEDULING AND COORDINATING APPLICATIONS OF FERTILIZERS, PESTICIDES, AND WATER IN AGRICULTURAL FIELDS

(71) Applicant: Lindsay Corporation, Omaha, NE (US)

(72) Inventor: Mark William Miller, Elkhorn, NE (US)

(73) Assignee: Lindsay Corporation, Omaha, NE (US)

( * ) Notice: Subject to any disclaimer, the term of this patent is extended or adjusted under 35 U.S.C. 154(b) by 748 days.

(21) Appl. No.: 17/084,708

(22) Filed: Oct. 30, 2020

(65) Prior Publication Data
US 2022/0132721 A1 May 5, 2022

(51) Int. Cl.
*A01C 21/00* (2006.01)
*A01M 7/00* (2006.01)
*A01G 25/16* (2006.01)

(52) U.S. Cl.
CPC ......... *A01M 7/0089* (2013.01); *A01C 21/005* (2013.01); *A01G 25/165* (2013.01)

(58) Field of Classification Search
CPC .. A01G 25/162; A01G 25/165; A01B 79/005; A01B 79/02; A01C 21/005
See application file for complete search history.

(56) References Cited

U.S. PATENT DOCUMENTS

| | | | |
|---|---|---|---|
| 4,209,131 A * | 6/1980 | Barash | G05D 22/02 239/69 |
| 5,927,603 A * | 7/1999 | McNabb | A01G 25/167 239/69 |
| 9,265,187 B2 | 2/2016 | Cavender-Bares et al. | |
| 10,015,938 B1 * | 7/2018 | Malsam | C05G 3/50 |
| 10,271,474 B1 * | 4/2019 | Miller | A01G 25/06 |
| 11,107,167 B2 * | 8/2021 | Singh | G06Q 50/02 |
| 2014/0129039 A1 | 5/2014 | Olive-Chahinian et al. | |
| 2015/0101519 A1 | 4/2015 | Blackwell et al. | |

(Continued)

FOREIGN PATENT DOCUMENTS

| | | |
|---|---|---|
| CN | 107396815 | 11/2017 |
| WO | 98-13780 | 4/1998 |

(Continued)

OTHER PUBLICATIONS

Intl. Search Report and Written Opinion dated Jan. 28, 2022 for PCT Appln. No. PCT/US2021/055147, Filed Oct. 15, 2021 and all references cited therein.

*Primary Examiner* — Jamie L McGowan
(74) *Attorney, Agent, or Firm* — Hovey Williams LLP

(57) ABSTRACT

Systems and methods for scheduling and coordinating applications of fertilizers, pesticides, and water to fields while avoiding interferences between vehicles and other equipment may be implemented with a mobile irrigation system, a fertilizer applicator, a pesticide applicator, and a processing system. The processing system schedules and coordinates applications of fertilizers, pesticides, and water and prevents interferences between the machines primarily with data received from an irrigation schedule implemented by the irrigation system and data received from the fertilizer and pesticide applicators.

21 Claims, 5 Drawing Sheets

(56) References Cited

U.S. PATENT DOCUMENTS

| | | |
|---|---|---|
| 2016/0253595 A1 | 9/2016 | Mathur et al. |
| 2017/0127622 A1 | 5/2017 | Hong |
| 2018/0007847 A1* | 1/2018 | Raj ................... G05D 1/0094 |
| 2019/0357425 A1* | 11/2019 | Dharna ................ G06Q 50/02 |
| 2020/0272317 A1 | 8/2020 | Miller |
| 2020/0305366 A1* | 10/2020 | Burkey ................ A01G 25/16 |
| 2022/0124992 A1* | 4/2022 | Charling .............. A01G 25/092 |
| 2022/0132721 A1* | 5/2022 | Miller ................ A01B 69/008 |
| | | 47/48.5 |
| 2022/0232816 A1* | 7/2022 | Vandike ................ A01C 7/046 |

FOREIGN PATENT DOCUMENTS

| | | | |
|---|---|---|---|
| WO | 2014160589 | 10/2014 | |
| WO | WO-2014160589 A1 * | 10/2014 | ........... A01B 79/005 |

\* cited by examiner

SYSTEMS AND METHODS FOR SCHEDULING AND COORDINATING APPLICATIONS OF FERTILIZERS, PESTICIDES, AND WATER IN AGRICULTURAL FIELDS

BACKGROUND OF THE INVENTION

1. Field of the Invention

The present invention relates to mobile irrigation systems and fertilizer and pesticide applicators. More particularly, the invention relates to systems and methods for scheduling and coordinating applications of fertilizers, pesticides, and water in fields in which crops are grown.

2. Background

Proper application of water, fertilizers, and pesticides to crops is important to maximize crop yield and health, minimize water and chemical usage and costs, and reduce or eliminate contaminant runoff into rivers, streams, and other bodies of water. Historically, the scheduling and coordination of such water and chemical applications has been done manually and/or based on set schedules. Manual scheduling of irrigation and chemical applications is time-consuming and often fails to maximize crop yield and health, minimize costs, and prevent runoff because operators often don't have access to all the data needed to determine the ideal application times and amounts or simply don't have the ability to consider all such data even if it is available.

Software-enabled scheduling systems have been developed to assist with the scheduling of irrigation and chemical applications, but such systems also often don't have access to all the data needed to determine the ideal application times and amounts and often don't account for real-time and changing conditions of crops and the fields in which they are grown. Sophisticated central monitoring and control systems have been developed for more precisely scheduling and tracking irrigation and chemical applications, but such systems are hardware and software intensive and require skilled operators to implement and thus are impractical for many farms.

Water, fertilizers, and pesticides are sometimes simultaneously applied to the same field with more than one vehicle or other piece of equipment. For example, mobile irrigation systems often irrigate fields while tractors, trucks, and other vehicles apply fertilizers and pesticides or perform other farming activities in the fields. Simultaneously operating several pieces of equipment in the same field can result in collisions and other interferences between the equipment, especially when some of the equipment operates autonomously or semi-autonomously. Collision detection and avoidance systems have been developed to reduce the likelihood of such collisions and interferences, but these systems require cameras, LIDAR systems, RADAR systems, and/or other location tracking and control systems and are therefore impractical for smaller farms.

SUMMARY

The present invention solves the above described problems and other related problems by providing improved systems and methods for scheduling and coordinating applications of fertilizers, pesticides, and water in fields while avoiding interferences between vehicles and other equipment that simultaneously enter and/or operate in the field. The invention determines ideal application times and amounts based on real-time and changing conditions in fields, is less hardware intensive than many prior art automated systems, and does not require sophisticated central monitoring and control systems. Embodiments of the invention may be implemented with a mobile irrigation system, a fertilizer applicator, a pesticide applicator, and a processing system.

The mobile irrigation system may be a central pivot irrigation system or a lateral move irrigation system and includes a number of mobile support towers connected to a source of water and attached to one another by truss-type framework sections. The mobile support towers are supported on wheels driven by electric or hydraulic motors. A water distribution conduit is supported by the framework sections, and a number of sprinkler heads, spray guns, drop nozzles, or other water emitters are spaced along the length of the conduit for irrigating crops below the irrigation system. A control system controls the speed of the mobile towers and/or the opening and closing of water valves under the direction of one or more irrigation plans or schedules to deliver prescribed amounts of water to different portions of the field to accommodate different soil conditions, types of crops, and the existence of roads, boundaries, etc. in the field. Such irrigation schedules specify when and how much water to apply to a field and therefore can be used, along with other data tracked by the control system, to determine when, where, and how much water is being delivered to crops.

The fertilizer and pesticide applicators may be autonomous, semi-autonomous, or manually operated tractors, sprayers, spreaders, trucks, or any other farm equipment that can be used to apply fertilizers, pesticides, and/or other chemicals to crops. Each applicator includes a control system for controlling and tracking its operations and locations and for transmitting data to and receiving data from the processing system. The control system of the fertilizer applicator operates partially in accordance with a fertilizer schedule that schedules when, where, and how much fertilizer to apply to a field. The fertilizer schedule may also include data representative of a planned route in the field while applying the fertilizers to the field. Likewise, the control system of the pesticide applicator operates partially in accordance with a pesticide schedule that schedules when, where, and how much pesticides to apply to a field. The pesticide schedule may also includes data representative of a planned route in the field while applying the pesticides to the field.

The processing system receives data from and transmits data to the control systems of the irrigation system and the fertilizer and pesticide applicators to schedule and coordinate applications of fertilizers, pesticides, and water on crops and to avoid interferences between the machines. The processing system may be incorporated in the control system of the irrigation system, may be separate from the control system but still located on the irrigation system, or may be hosted on a cloud-based server system or another external computer server that communicates with the control systems.

In accordance with an important aspect of the present invention, the processing system schedules and coordinates applications of fertilizers, pesticides, and water and prevents interferences between the machines primarily with data received from the irrigation schedule implemented by the irrigation system and data received from the fertilizer and pesticide applicators. This accounts for real-time conditions in the field and eliminates the need for sophisticated and expensive centralized monitoring and control systems as well as dedicated cameras, RADAR, LIDAR, or other collision avoidance hardware.

In one embodiment, the processing system implements a method comprising the following steps: receiving data from the irrigation schedule; receiving data from the fertilizer schedule; receiving data from the pesticide schedule; determining a coordinated water/fertilizer/pesticide application schedule that indicates when to apply water, fertilizers, and pesticides to the field based on the data from the irrigation schedule, the fertilizer schedule, and the pesticide schedule; receiving location data representative of a location of the mobile irrigation system as it is being operated; receiving location data representative of a location of the fertilizer applicator; receiving location data representative of a location of a pesticide applicator; determining when the fertilizer applicator may enter the field and apply fertilizers to the field based on the coordinated water/fertilizer/pesticide application schedule, the location of the mobile irrigation system, and the location of the pesticide applicator; and determining when the pesticide applicator may enter the field and apply pesticides to the field based on the coordinated water/fertilizer/pesticide application schedule, the location of the mobile irrigation system, and the location of the fertilizer applicator.

In some embodiments, the processing system may further determine whether the location or the planned route of the fertilizer applicator will interfere with operation of the mobile irrigation system and instruct the fertilizer applicator to not enter the field or to exit the field if its location or planned route will interfere with the mobile irrigation system. Similarly, the processing system may further determine whether the location or the planned route of the pesticide applicator will interfere with operation of the mobile irrigation system in accordance with the irrigation schedule and instruct the pesticide applicator to not enter the field or to exit the field if its location or planned route will interfere with the mobile irrigation system. The processing system may further determine whether the fertilizer applicator and the pesticide applicator are likely to interfere with one another based on their locations or planned routes and instruct either or both stop if they are likely to interfere with one another.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures. For example, the principles of the present invention are not limited to central pivot irrigation systems but may be implemented in other types of irrigation systems including linear move irrigation systems.

BRIEF DESCRIPTION OF THE DRAWING FIGURES

Embodiments of the present invention are described in detail below with reference to the attached drawing figures, wherein.

Figure 1:
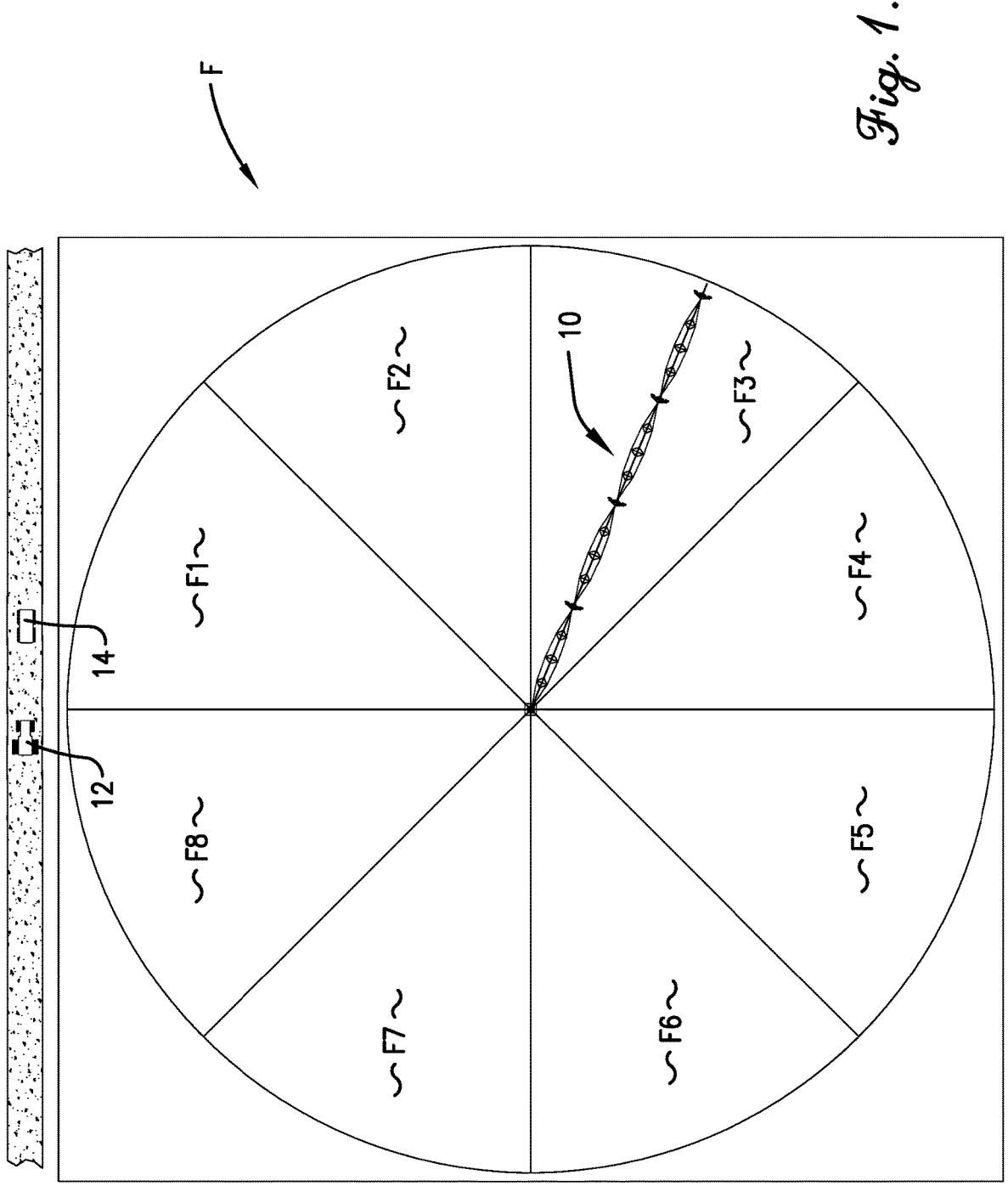
FIG. 1 is a schematic plan view of an agricultural field that has been subdivided into a number of sections with an irrigation system, a fertilizer applicator, and a pesticide applicator positioned in or near the field.

The drawing figures do not limit the present invention to the specific embodiments disclosed and described herein. The drawings are not necessarily to scale, emphasis instead being placed upon clearly illustrating the principles of the invention.

DETAILED DESCRIPTION

Figure 4:
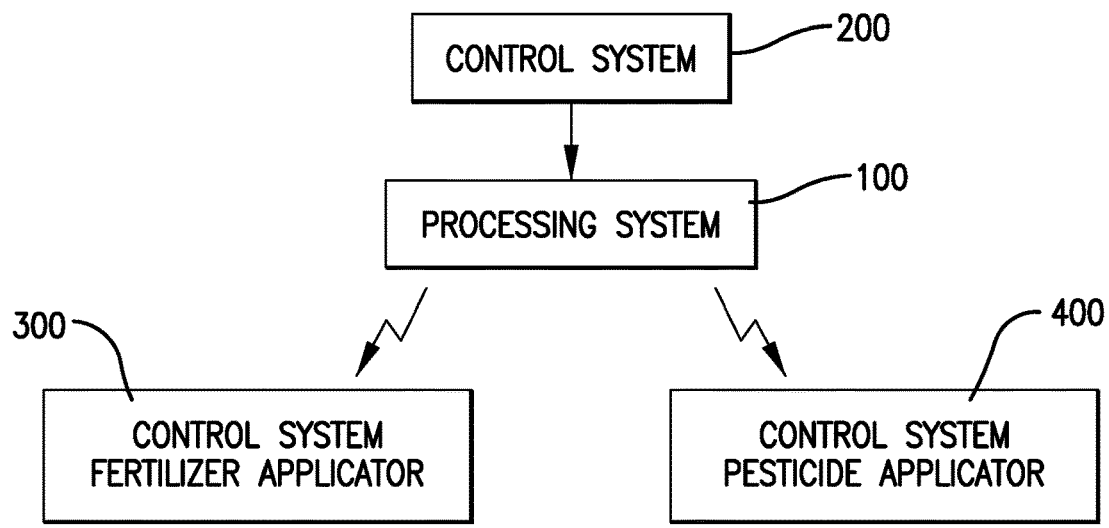
FIG. 4 is a block diagram that depicts a processing system communicating with control systems of the irrigation system and the fertilizer and pesticide applicators.

The present invention provides improved systems and methods for scheduling and coordinating applications of fertilizers, pesticides, and water in fields while preventing interferences between machines that perform such operations. As shown in FIGS. 1 and 4, embodiments of the invention may be implemented with a mobile irrigation system 10, a fertilizer applicator 12, and a pesticide applicator 14 that operate in an irrigated field F and a processing system 100 that coordinates operations of the equipment, prevents interferences between the equipment, and takes corrective action if likely interferences are detected.

Figure 2:
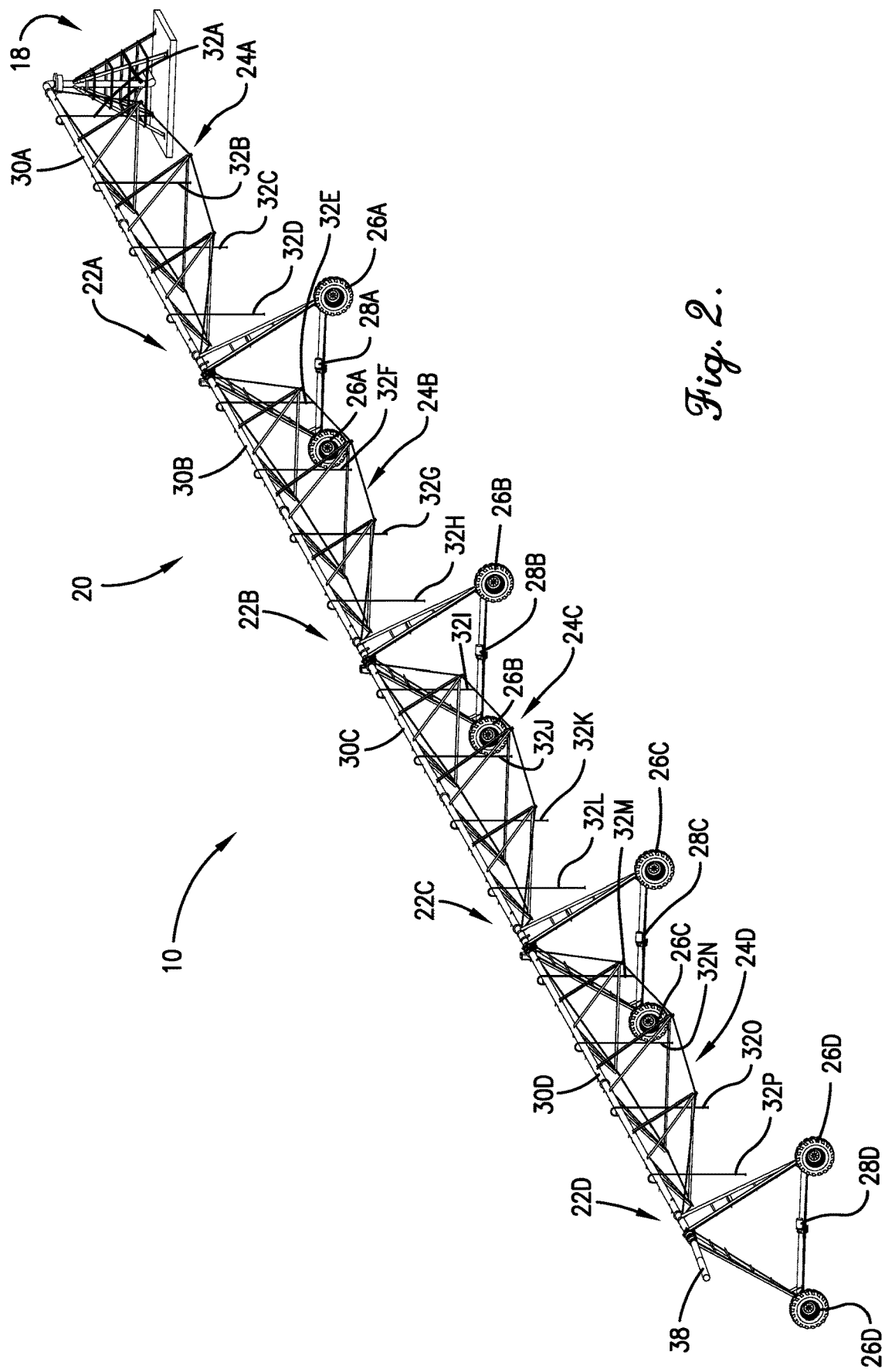
FIG. 2 is a perspective view of an exemplary central pivot irrigation system that may be used to implement aspects of the present invention.

An exemplary irrigation system 10 that may be used with the present invention is illustrated in FIG. 2. The irrigation system 10 is a central pivot irrigation system, but the principles of the present invention also apply to linear move or lateral type irrigation systems or any other type of automated irrigation systems. The illustrated irrigation system 10 broadly comprises a fixed central pivot 18, a main section 20 pivotally connected to the central pivot, and a control system 200 (FIG. 3) for controlling operation of the irrigation system.

The fixed central pivot 18 may be a tower or any other support structure about which the main section 20 pivots. The central pivot has access to a well, water tank, or other source of water and may also be coupled with a tank or other source of agricultural products to inject fertilizers, pesticides and/or other chemicals into the water for application during irrigation.

The main section 20 pivots or rotates about the central pivot 18 and includes a number of mobile support towers 22A-D, the outermost 22D of which is referred to herein as an end tower. The mobile towers are connected to the fixed central pivot 18 and to one another by truss sections 24A-D or other supports to form a number of interconnected spans. The illustrated irrigation system 10 has four mobile support towers, and thus four spans, however, it may comprise any number of towers and spans without departing from the scope of the invention The mobile towers have wheels 26A-D driven by drive motors 28A-D. Each motor 28A-D turns at least one of the wheels 26A-D through a drive shaft to move its mobile tower and thus the main section 20 in a circle or semi-circle about the central pivot 18. The motors 28A-D may include integral or external relays so they may be turned on, off, and reversed by the control system 100 as described below. The motors may also have several speeds or be equipped with variable speed drives.

Although not required, some or all of the towers 22A-D may be equipped with steerable wheels pivoted about upright axes by suitable steering motors so that the towers can follow a predetermined track. U.S. Pat. No. 4,508,269 in the name of Davis et al. is hereby incorporated by reference in its entirety into the present specification for a disclosure of ground drive motors and steering motors associated with an irrigation machine. As is also well known, the drive motors for the towers are controlled by a suitable safety system such that they may be slowed or completely shut down in the event of the detection of an adverse circumstance.

Each of the truss sections 24A-D carries or otherwise supports a conduit section 30A-D or other fluid distribution mechanism that is connected in fluid communication with all other conduit sections and to a source of fluids from the central pivot. A plurality of sprinkler heads, spray guns, drop nozzles, or other water emitters 32A-P are spaced along the conduit sections 30A-D to apply water and/or other fluids to land underneath the irrigation system.

At least one valve is disposed between the conduit sections 30A-D and the water emitters 32A-P to control the flow of water through the water emitters. In some embodiments, the irrigation system includes several valves, and each valve controls the flow of water through a single water emitter such that each water emitter can be individually opened, closed, pulsed, etc. to emit any amount of water. In an embodiment illustrated in FIG. 3, the irrigation system 10 includes several valves 34A-D that each control the flow of water through a group of water emitters such that the group of water emitters is controlled to emit a specific amount of water. For example, each span of the irrigation system may include four water emitters, and one valve may control the water flow through all four water emitters such that all of the water emitters on a span operate in unison. The valves may be magnetic latching solenoid valves that are normally biased to an off/closed state such that the valves only switch to an on/open state when powered, but they may be any type of valve.

The irrigation system 10 may also include at least one flow meter 36 (FIG. 3) that measures water flow rates through the system and provides flow rate data to the control system 100. In one embodiment, a single flow meter measures flow rates through the entire irrigation system and provides an indication of this aggregate flow rate to the control system. In other embodiments, multiple flow meters provide flow-rate measurements through different portions of the irrigation system, such as through each span of the irrigation system or even each water emitter.

Embodiments of the irrigation system 10 may also include a pressure regulator for regulating the pressure of water through to the irrigation system. Pumps that provide water to the irrigation system may be configured to provide a minimum water pressure, and the pressure regulator then reduces the pump water pressure to a selected maximum pressure level such that the pumps and pressure regulator together provide a relatively constant water pressure through the irrigation system. However, the water pressure of the irrigation system may still fluctuate as the irrigation system moves about a field and/or over time as the pressure regulator ages.

The irrigation system 10 may also comprise other components such as an extension arm (also commonly referred to as a "swing arm" or "corner arm") pivotally connected to the free end of the main section and/or one or more high pressure sprayers or end guns 38 mounted to the end tower 22D or to the end of the extension arm. The end guns are activated at the corners of a field or other designated areas to increase the amount of land that can be irrigated.

Figure 3:
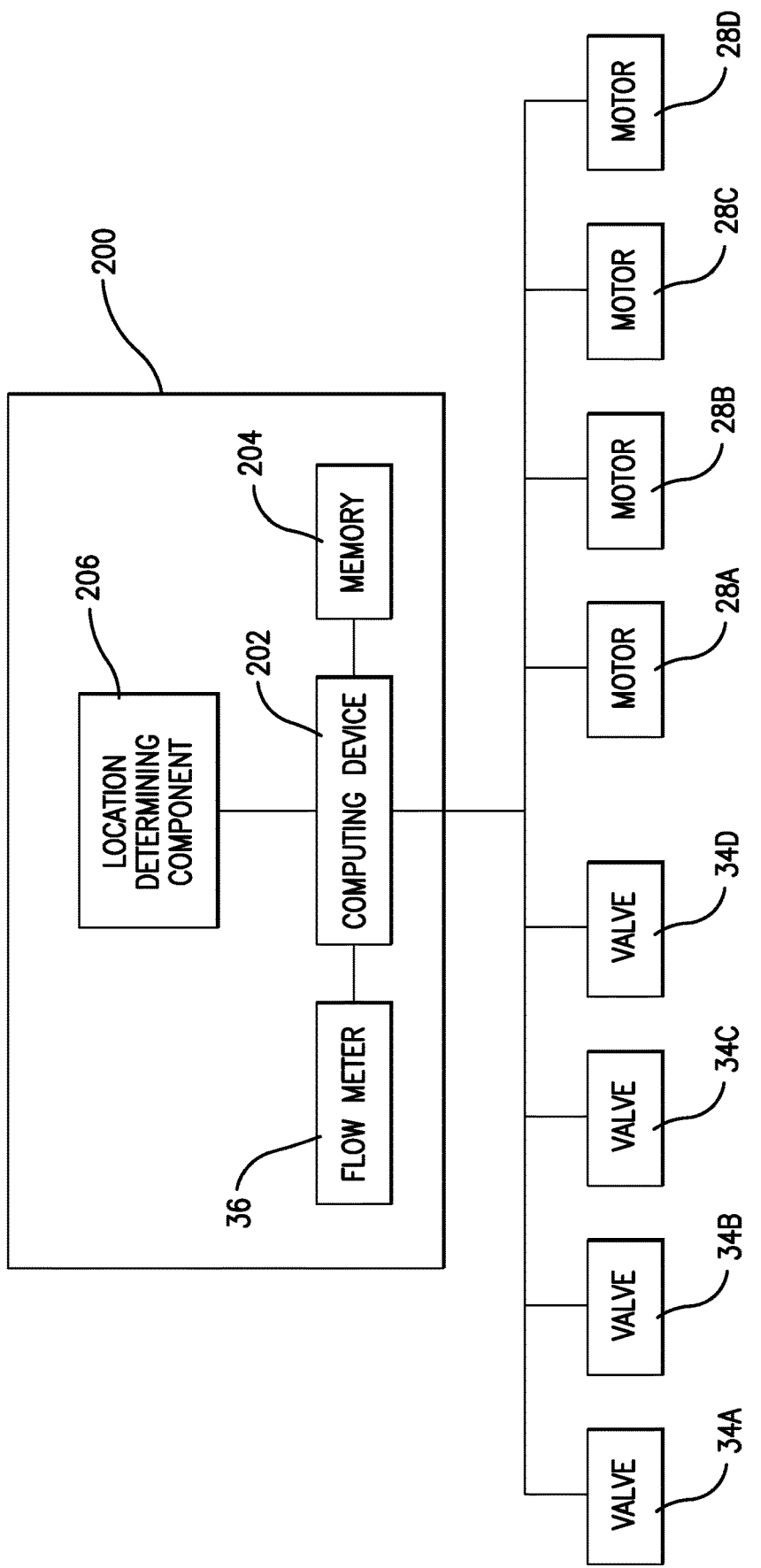
FIG. 3 is a block diagram that depicts selected components of the irrigation system.

The control system 200 controls operation of the irrigation system and provides data to the processing system 100 as described in more detail below. The control system can be implemented with hardware, software, firmware, or a combination thereof. Selected components of an exemplary control system 200 are illustrated in FIG. 3 and include a controller, processor, or other computing device 202, memory 204, and a location-determining component 206. The control system 200 may also include conventional input devices such as knobs, buttons, switches, dials, etc.; inputs for receiving programs and data from external devices; one or more displays; a cellular or other radio transceiver for wirelessly receiving and transmitting data from and to remote devices; a Bluetooth transceiver; a WiFi transceiver; and/or other electronic components.

The computing device 202 may comprise or include any number or combination of processors, controllers, ASICs, computers, or other control circuitry. As illustrated in FIG. 3, the computing device includes data inputs for receiving data from the flow-meter 36 and the location-determining component 206 and outputs connected to the relay-controlled valves 34A-B and the relay-controlled drive motors 28A-D. The control system 100 is shown in FIG. 3 controlling four drive motors 28A-D and four valves 34A-D, but it may control any number of motors and valves and other components of the irrigation system.

Some of the control functions described herein may be implemented with one or more computer programs executed by the computing device 202. Each computer program comprises an ordered listing of executable instructions for implementing logical functions in the computing device 202 and can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any means that can contain, store, communicate, propagate or transport the program for use by or in connection with the instruction execution system, apparatus, or device including, but not limited to, the memory 204. The computer-readable medium can be, for example, but not limited to, an electronic, magnetic, optical, electromagnetic, infrared, or semi-conductor system, apparatus, device, or propagation medium. More specific, although not inclusive, examples of the computer-readable medium would include the following: an electrical connection having one or more wires, a random access memory (RAM), a read-only memory (ROM), an erasable, programmable, read-only memory (EPROM or Flash memory), an optical fiber, and a portable compact disk read-only memory (CDROM).

The memory 204 may be any electronic memory that can be accessed by the computing device 202 and operable for storing instructions or data. The memory 204 may be integral with the computing device 202 or may be external memory accessible by the computing device. The memory may be a single component or may be a combination of components that provide the requisite functionality. The memory may include various types of volatile or non-volatile memory such as flash memory, optical discs, magnetic storage devices, SRAM, DRAM, or other memory devices capable of storing data and instructions. The memory may communicate directly with the computing device or may communicate over a bus or other mechanism that facilitates direct or indirect communication. The memory may optionally be structured with a file system to provide organized access to data existing thereon.

The location-determining component 206 may be any device capable of determining positions of the irrigation system. The location-determining component may comprise, for example, angle encoders positioned at the central pivot 18 and the joint of each span of the irrigation system for sensing an angle between the central pivot 18 and the main section 20 and between each span of the irrigation system. In some embodiments, the angle encoders may be incorporated in existing articulating joints positioned between the spans so that the control system does not require its own dedicated angle encoders. The location-determining component 206 may also comprise one or more modified cam switches, proximity switches, optical encoders, potentiometers, light bar sensors, etc. at each span joint.

The location-determining component 206 may also be a global navigation satellite system (GNSS) receiver such as a GPS receiver, Glonass receiver, Galileo receiver, or compass system receiver attached to or near one or more of the mobile towers and operable to receive navigational signals from satellites to calculate positions of the mobile towers as a function of the signals. Each GNSS receiver may include one or more processors, controllers, or other computing devices and memory for storing information accessed and/or generated by the processors or other computing devices. In some embodiments, a single GNSS receiver receives satellite signals from separate antennas mounted to each mobile tower so that a receiver is not required at each tower. The GNSS receiver or receivers may be incorporated in the main control system so that the control system does not require its own dedicated GNSS receivers or may be stand-alone devices. Each GNSS receiver may be coupled with a patch antenna, helical antenna, or any other type of antenna.

The location-determining component 206 may also comprise other type of receiving devices capable of receiving location information from at least three transmitting locations and performing basic triangulation calculations to determine the relative position of the receiving device with respect to the transmitting locations. For example, cellular towers or any customized transmitting radio frequency towers can be used instead of satellites. With such a configuration, any standard geometric triangulation algorithm can be used to determine the exact location of the receiving unit.

Some or all of the components of the control system 200 may be enclosed in or supported on a weatherproof housing for protection from moisture, vibration, and impact. The housing may be positioned anywhere on or near the irrigation system and may be constructed from a suitable vibration- and impact-resistant material such as, for example, plastic, nylon, aluminum, or any combination thereof and may include one or more appropriate gaskets or seals to make it substantially waterproof or resistant.

The above-described components of the control system 200 need not be physically connected to one another since wireless communication among the various depicted components is permissible and intended to fall within the scope of the present invention. Thus, portions of the control system 200 may be located remotely from the irrigation system and from each other.

The control system 200 controls operational aspects of the irrigation system such as the speed and direction of the mobile towers, and hence the speed of the irrigation system, via control signals provided to the relays connected to the motors 28A-D of the mobile towers. Likewise, the control system 100 controls the water flow through the water emitters 32A-P via control signals provided to the relays connected to the valves 34A-D. The control system may also control other operational aspects such as a fertilizer application rate, a pesticide application rate, end gun operation, mobile tower direction (forward or reverse), and/or system start-up and/or shut-down procedures.

The control system 200 controls some of the above-described operational aspects of the irrigation system in accordance with an irrigation plan or schedule (also sometimes referred to as a "sprinkler chart" or "watering plan"). An irrigation schedule specifies when and how much water to apply to a field, and sometimes to different portions of a field, based on various different criteria such as the types of crops to be irrigated; the soil conditions in various parts of the field; the existence of slopes, valleys, etc. in the field; the existence of roads, buildings, ponds, and boundaries that require no irrigations; crop growth cycles; etc. One or more irrigation plans may be created then stored in the memory 204 or otherwise be accessible by the computing device 202.

An exemplary irrigation schedule for the field F is graphically depicted in FIG. 1. The circle in the center of the field denotes the approximate path of the last mobile tower 22D of the irrigation system 10. The circle is divided into 8 equal wedge-shaped sections F1-8, but it may be divided into any number of sections of any size. Each of the wedge-shaped sections may require different amounts of irrigation for the reasons discussed above. The corners of the field outside the wedge-shaped sections may be irrigated by the end guns 38 or swing towers on the last mobile tower 22D.

An irrigation schedule that corresponds to the field F indicates how much water is desired in each of the wedge-shaped sections F1-8. For example, the irrigation schedule may call for 10 gallons per minute (GPM) in section F1, 20 GPM in section F2, 0 GPM in section F3, etc. This particular irrigation plan is likely for an irrigation system in which all the water emitters are turned on or off together (only one valve for the entire irrigation system) because each wedge-shaped section is not further sub-divided into smaller sections served by just some of the water emitters. Other irrigation plans may provide more discrete control of the water emitters with additional valves.

The irrigation schedule described above and/or other irrigation schedules are stored in the memory 204 or may otherwise be accessible by the computing device 202. Each irrigation schedule includes data that represents the geographical boundaries of each of its sections and sectors and data that represents the desired fluid amount or flow rate in the sections and sectors. For example, an irrigation schedule may include data that represents the boundaries or position of annulus section F1 and a desired water flow rate of 20 GPM in this section. The irrigation schedule also denotes when (date and time) the irrigation system should start and stop operating. When the irrigation system is operating, the control system 200 adjusts the speed of the mobile towers, the positions of the valves, and/or other operational aspects of the irrigation system to achieve the amount of irrigation prescribed by one of the irrigation plans in the sections and sectors and monitors the position of the irrigation system as it operates.

Those skilled in the art will appreciate that the above-described irrigation schedules are only examples and that many different irrigation schedules may be created for the irrigation system 10. A more detailed explanation of irrigation schedules is provided in U.S. Pat. No. 8,739,830, which is incorporated by reference into the present applicant in its entirety.

The fertilizer and pesticide applicators 12 and 14 will now be described in more detail. Although only two such machines are shown and described, embodiments of the invention may be used to coordinate the movement of any number of agricultural machines. The applicators 12, 14 may be autonomous, semi-autonomous, or fully manually operated tractors, combines, fertilizer applicators, pesticide sprayers, manure spreaders, trucks, or any other mobile farm equipment. The mechanical and drive components of machines are well known and will not be described in detail in this application. Exemplary autonomous and semi-autonomous agricultural vehicles that may be used to perform some of the functions of the fertilizer and pesticide applicators 12 and 14 are disclosed in U.S. Pat. No. 9,265,187, which is hereby incorporated into the present application in its entirety by reference.

As shown in FIG. 4, the fertilizer applicator 12 includes a control system 300 and the pesticide applicator 14 includes a control system 400. Both control systems send data to and receive data from the processing system 100. Each control system can be implemented with hardware, software, firmware, or a combination thereof. The control systems 300, 400 are essentially identical, so only the control system 300 will be described in detail.

Figure 6:
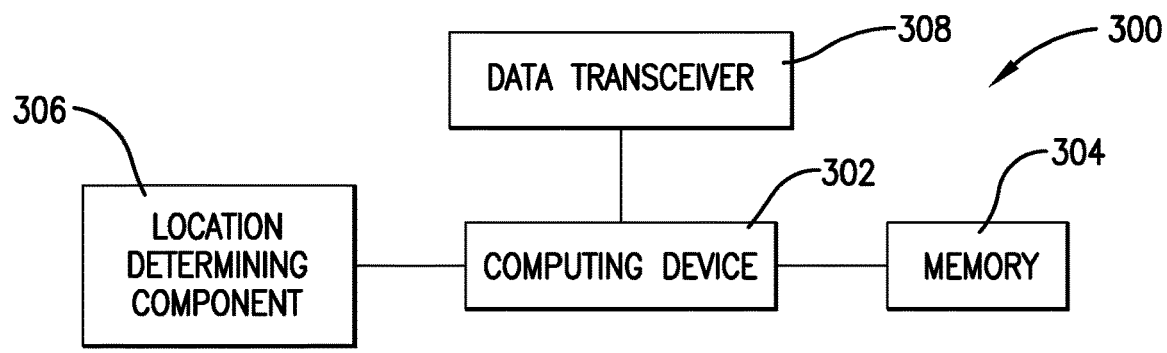
FIG. 6 is a block diagram that depicts selected components of the control system of the fertilizer applicator.

Selected components of the control system 300 are illustrated in FIG. 6 and include a controller, processor, or other computing device 302, memory 304, a location-determining component 306, and a data transceiver 308. The control system 300 may also include conventional input devices such as knobs, buttons, switches, dials, etc.; inputs for receiving programs and data from an operator and/or other devices; and/or one or more displays.

The computing device 302 may comprise or include any number or combination of processors, controllers, ASICs, computers, or other control circuitry. Some of the control functions described herein may be implemented with one or more computer programs executed by the computing device 302. Each computer program comprises an ordered listing of executable instructions for implementing logical functions in the computing device and can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions.

The memory 304 may be any electronic memory that can be accessed by the computing device and operable for storing instructions or data. The memory may be integral with the computing device or may be external memory accessible by the computing device. The memory may be a single component or may be a combination of components that provide the requisite functionality and may include various types of volatile or non-volatile memory such as flash memory, optical discs, magnetic storage devices, SRAM, DRAM, or other memory devices capable of storing data and instructions. The memory may communicate directly with the computing device or may communicate over a bus or other mechanism that facilitates direct or indirect communication. The memory may optionally be structured with a file system to provide organized access to data existing thereon.

The location-determining component 306 may be any device capable of determining positions of the agricultural machine 12. The location-determining component may comprise, for example, a global navigation satellite system (GNSS) receiver such as a GPS receiver, Glonass receiver, Galileo receiver, or compass system.

The data transceiver 308 may be a cellular or other radio transceiver; a Bluetooth transceiver; a WiFi transceiver; and/or other electronic components configured for wirelessly receiving and transmitting data from and to other devices.

Some or all of the components of the control system 300 may be enclosed in or supported on a weatherproof housing for protection from moisture, vibration, and impact. The above-described components of the control system 300 need not be physically connected to one another since wireless communication among the various depicted components is permissible and intended to fall within the scope of the present invention. Thus, portions of the control system 300 may be located remotely from the agricultural machine and from each other.

The control system 300 may control operational aspects of the applicator 12 such as the speed, direction, and route of the machine as well as the application rate of fertilizers and other chemicals in accordance with a fertilizer schedule or other instructions received at the computing device. The fertilizer schedule may indicate when to apply fertilizers, where to access the field, and routes to travel within the field while applying the fertilizers.

Similarly, the control system 400 may control operational aspects of the applicator 14 such as the speed, direction, and route of the machine as well as the application rate of pesticides and other chemicals in accordance with a pesticide schedule or other instructions received at its computing device. The pesticide schedule may indicate when to apply pesticides, where to access the field, and routes to travel within the field while applying the pesticides.

The processing system 100 will now be described in more detail. The processing system communicates with the control system 200 of the irrigation system 10 and the control systems 300, 400 of the applicators 12, 14 and implements many of the aspects of the present invention described above and below. The processing system 100 can be implemented with hardware, software, firmware, or a combination thereof. In some embodiments, the processing system 100 is incorporated in the control system 200 of the irrigation system. In other embodiments, the processing system 100 is separate from the control system 200 but still located on the irrigation system. In other embodiments, the processing system 100 is hosted on a cloud-computing network or other external computer server.

Figure 5:
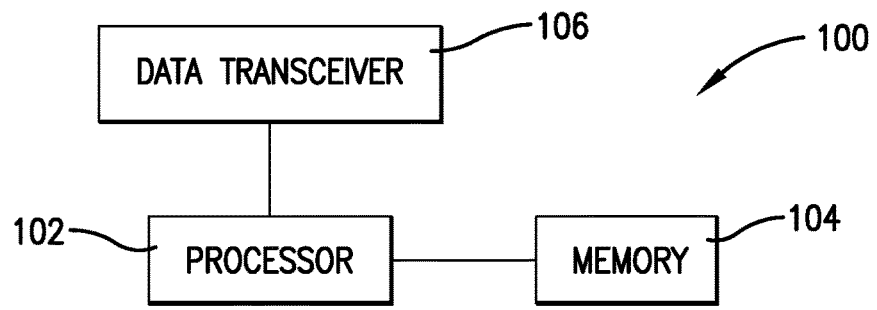
FIG. 5 is a block diagram that depicts selected components of the processing system.

Selected components of the processing system 100 are illustrated in FIG. 5 and include a controller, processor, or other computing device 102, memory 104, and a data transceiver 106. The processing system 100 may also include conventional input devices such as knobs, buttons, switches, dials, etc.; inputs for receiving programs and data from external devices; and one or more displays.

The computing device 102 may comprise or include any number or combination of processors, controllers, ASICs, computers, or other control circuitry. Some of the control functions described herein may be implemented with one or more computer programs executed by the computing device 102. Each computer program comprises an ordered listing of executable instructions for implementing logical functions in the computing device and can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions.

The memory 104 may be any electronic memory that can be accessed by the computing device 102 and operable for storing instructions or data. The memory may be integral with the computing device 102 or may be external memory accessible by the computing device. The memory may be a single component or may be a combination of components that provide the requisite functionality and may include various types of volatile or non-volatile memory such as flash memory, optical discs, magnetic storage devices, SRAM, DRAM, or other memory devices capable of storing data and instructions. The memory may communicate directly with the computing device or may communicate over a bus or other mechanism that facilitates direct or indirect communication. The memory may optionally be structured with a file system to provide organized access to data existing thereon.

The data transceiver 106 may be a cellular or other radio transceiver; a Bluetooth transceiver; a WiFi transceiver; and/or other electronic components configured for wirelessly receiving and transmitting data from and to other devices.

The above-described components of the processing system 100 need not be physically connected to one another since wireless communication among the various depicted components is permissible and intended to fall within the scope of the present invention. Thus, portions of the processing system may be located remotely from the irrigation system and from each other.

In accordance with important aspects of the present invention, the processing system 100 schedules and coordinates applications of fertilizers, pesticides, and water and prevents interferences between the irrigation system 10, the applicators 12, 14, and other machines primarily with data received from the irrigation schedule implemented by the irrigation system and data received from the fertilizer and pesticide applicators. This accounts for real-time conditions in the field and eliminates the need for sophisticated and expensive centralized monitoring and control systems as well as dedicated cameras, RADAR, LIDAR, or other collision avoidance hardware.

Figure 7:
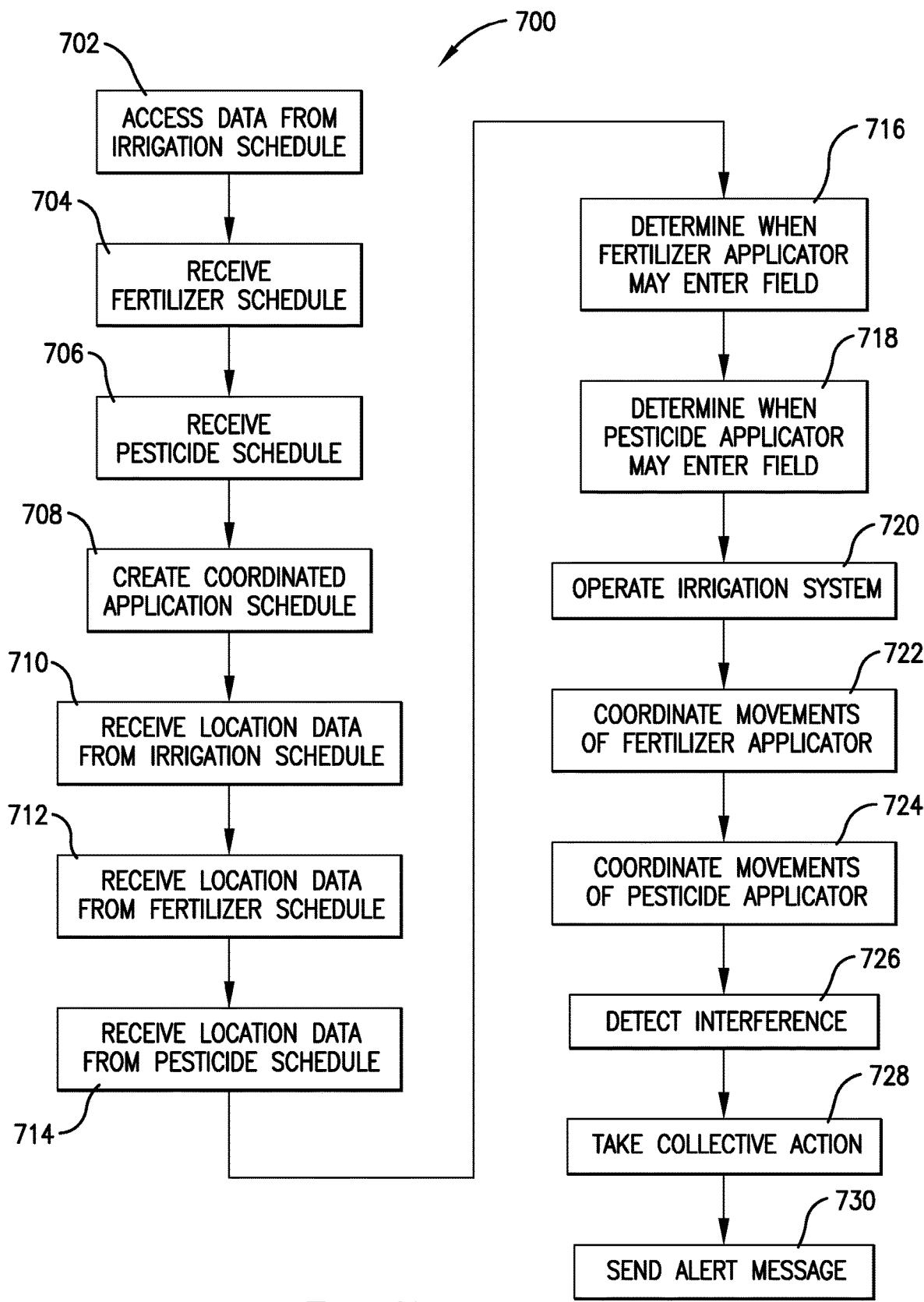
FIG. 7 is a flow diagram depicting exemplary steps in a method of the present invention or portions of a computer program of an embodiment of the present invention.

The flow chart of FIG. 7 shows the functionality and operation of an exemplary method 700 of the present technology. Some of the blocks of the flow chart may represent a step in the method 700 and/or a module section or portion of code of computer programs the operate the processing system 100 and/or the control systems 200, 300, 400. In some alternative implementations, the functions noted in the various blocks may occur out of the order depicted in FIG. 7. For example, two blocks shown in succession in FIG. 7 may in fact be executed substantially concurrently, or the block may sometimes be executed in the reverse order depending upon the functionality involved.

The method 700 begins in step 702 where the processing system 100 accesses data from the irrigation schedule in the control system 200 or otherwise accesses data regarding when and how much the irrigation system is scheduled to irrigate the field. As discussed above, the irrigation schedule is used to operate the mobile towers to move the irrigation system over a ground surface and activate and deactivate the water emitters. While the irrigation system is being operated, the control system 200 tracks its location with the location-determining component 206 so that the current location of the irrigation system is always known.

In step 704, the processing system 100 accesses or otherwise receives data from the fertilizer schedule stored in or associated with the control system 300 of the fertilizer applicator 12. As mentioned above, the fertilizer schedule directs the control system 300 to control operational aspects of the applicator 12 such as the speed, direction, and route of the machine as well as the application rate of fertilizers and other chemicals to control where the applicator accesses the field, when it applies fertilizers, and where it travels within the field while applying the fertilizers.

In step 706, the processing system 100 accesses or otherwise receives data from the pesticide schedule stored in or associated with the control system 400 of the pesticide applicator 14. As mentioned above, the pesticide schedule directs the control system 400 to control operational aspects of the applicator 14 such as the speed, direction, and route of the machine as well as the application rate of pesticides and other chemicals to control where the applicator accesses the field, when it applies pesticides, and where it travels within the field while applying the pesticides.

In step 708, the processing system 100 determines a coordinated water/fertilizer/pesticide application schedule based on the data from the irrigation schedule, the fertilizer schedule, and the pesticide schedule. The coordinated schedule indicates when to apply water, fertilizers, and pesticides to the field and in what order so as to maximize crop yield and health, minimize water and chemical usage and costs, and reduce or eliminate contaminant runoff into rivers, streams, and other bodies of water. Because the processing system 100 has access to data from the irrigation schedule, the fertilizer schedule, and the pesticide schedule, it can account for real time conditions in the field when scheduling when to apply water, fertilizers, and pesticides. For example, to ensure fertilizers are watered into the ground shortly after they are applied, the coordinated schedule may actuate the fertilizer applicator 12 before the irrigation system. In one embodiment, the coordinated schedule instructs the fertilizer applicator to enter the field and begin applying fertilizers 1-2 hours before the irrigation system is scheduled to irrigate the field. The coordinated schedule may also after the irrigation schedule so as to apply a prescribed amount of water that is optimal for watering the fertilizer into the ground without unwanted runoff. Because the processing system knows the planned route of the fertilizer applicator from the fertilizer schedule, it knows how much "lead time" to give the fertilizer applicator to complete its operations and exit the field before the irrigation system begins to operate.

Similarly, to ensure applied pesticides are not quickly washed off crops, the coordinated schedule may instruct the pesticide applicator 14 to enter the field and begin applying pesticides a pre-determined time after the irrigation system has irrigated the field. The coordinated schedule may delay reactivation of the irrigation system for a selected amount of time to allow the pesticides to stay on the crops longer. In one embodiment, the coordinated schedule directs the pesticide applicator to enter the field and apply pesticides at least one hour after the irrigation system has operated and delays any additional irrigation for at least 24 hours after the pesticides have been applied. The processing system may also alter the amount of water applied by the irrigation system after the pesticides are applied to eliminate or reduce runoff.

Before implementing the coordinated application schedule to apply water, fertilizers, and pesticides to the field, the processing system 100 determines the current locations of the irrigation system 10, the fertilizer applicator 12, and the pesticide applicator 14. In step 710, the processing system receives location data representative of a location of the mobile irrigation system. The location data may be obtained from the location-determining component 206 in the control system 200 of the irrigation system.

In step 712, the processing system 100 receives location data representative of a location of the fertilizer applicator 12 and the planned route of the applicator. The location data may be received from the location-determining component 306 in the control system 300 of the applicator and the route data may be obtained from the fertilizer schedule or other route data stored in the memory 304 of the control system.

In step 714, the processing system 100 receives location data representative of a location of the pesticide applicator 14 and the planned route of the applicator. The location data may be obtained by the location-determining component in the control system 400 of the pesticide applicator and the route data may be obtained from the pesticide schedule or other route data stored in the memory of the control system.

In step 716, the processing system 100 determines when the fertilizer applicator may enter the field and apply fertilizers to the field based on the coordinated water/fertilizer/pesticide application schedule, the location of the mobile irrigation system, and the location of the pesticide applicator. Similarly, in step 718, the processing system determines when the pesticide applicator may enter the field and apply pesticides to the field based on the coordinated water/fertilizer/pesticide application schedule, the location of the mobile irrigation system, and the location of the fertilizer applicator.

In steps 720, 177, and 724 the processing system 100 sends instructions to the irrigation system 10, the fertilizer applicator 12, and the pesticide applicator 14 to operate the equipment in accordance with the coordinated application schedule. In one embodiment, the processing system 100 first determines that the irrigation system 10 is not operating and is in a "home" position on the field and the pesticide applicator 14 is not on the field. The processing system, under the control of the coordinated schedule, then activates the fertilizer applicator 12 and tracks its location. After the fertilizer applicator has exited the field, the processing system, under the control of the coordinated schedule, activates the irrigation system to "water-in" the applied fertilizer. After the irrigation system has completed its operation, the processing system confirms the irrigation system is not operating and is in a "home" position on the field and the fertilizer applicator is not on the field. The processing system, under the control of the coordinated schedule, then activates the pesticide applicator and tracks its locations. The processing system then delays any additional irrigation for at least an hour and preferably 24 hours. These steps are then repeated periodically in accordance with the coordinated application schedule.

As the processing system 100 coordinates the operations of the irrigation system, the fertilizer applicator, and the pesticide applicator, it also tracks their locations and prevents interferences between the equipment. In one embodiment, the processing system determines whether the location of the fertilizer applicator or the planned route of the fertilizer applicator will interfere with operation of the mobile irrigation system in accordance with the irrigation schedule and instructs the fertilizer applicator to not enter the field or to exit the field if the location of the fertilizer applicator or the planned route of the fertilizer applicator will interfere with operation of the mobile irrigation system. Similarly, the processing system determines whether the location of the pesticide applicator or the planned route of the pesticide applicator will interfere with operation of the mobile irrigation system in accordance with the irrigation schedule and instruct the pesticide applicator to not enter the field or to exit the field if the location of the pesticide applicator or the planned route of the pesticide applicator will interfere with operation of the mobile irrigation system.

The processing system 100 may further determine whether any of the equipment is likely to interfere with other equipment in step 726. In one embodiment, the processing system determines whether the fertilizer applicator and the pesticide applicator are likely to interfere with one another based on the location of the pesticide applicator, the planned route of the pesticide applicator, the location of the fertilizer applicator, and the planned route of the fertilizer applicator.

If the processing system 100 determines continued operations of the fertilizer applicator and/or the pesticide applicator are likely to interfere with operation of the irrigation system or with each other, it takes corrective action as depicted in step 728. For example, the processing system may instruct the fertilizer applicator and/or the pesticide applicator to stop, exit the field, or move to a portion of the field that does not interfere with operation of the irrigation system. In other embodiments, the processing system may instead stop and/or reverse direction of the irrigation system. In still other embodiments, the processing system may direct all the controlled equipment in the field to stop moving.

The processing system 100 may also generate an alert message and send it to a communication device of an operator if it determines the paths of the irrigation system, fertilizer applicator, and/or pesticide applicator are likely to interfere as depicted in step 730 so the operator may take appropriate actions.

In other embodiments of the invention, the processing system 100 may consider field information about the irrigated field, such as the boundaries of the field; the positions of any roads, bridges, ponds, streams, or other obstacles in the field; etc. when coordinating movement of the irrigation system 10 and the applicators 12, 14. Such field information is typically gathered when designing and installing an irrigation system and is therefore available to the control system 200 of the irrigation system and may be obtained by the processing system 100. Such field information may be stored in the memory 204 of the control system 200 or other memory and accessed by the processing system 100. For example, before or after allowing an applicator 12, 14 to enter the field, the processing system may identify roads or other suitable exits near the planned route of the applicator so it can quickly exit the field if a possible future collision or other interference is detected.

The above steps can be repeated continuously or periodically while the equipment continues to operate in the field F. In other embodiments, similar steps are performed to coordinate additional equipment in the field.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as the processing system 100 and control systems 200, 300, 400 may be implemented as special purpose or as general purpose devices. For example, the processing system may comprise dedicated circuitry or logic that is permanently configured, such as an application-specific integrated circuit (ASIC), or indefinitely configured, such as an FPGA, to perform certain operations. The processing system may also comprise programmable logic or circuitry (e.g., as encompassed within a general-purpose processor or other programmable processor) that is temporarily configured by software to perform certain operations. It will be appreciated that the decision to implement the processing system as special purpose, in dedicated and permanently configured circuitry, or as general purpose (e.g., configured by software) may be driven by cost and time considerations.

Accordingly, the terms "processing system" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing system is temporarily configured (e.g., programmed), each of the processing elements need not be configured or instantiated at any one instance in time. For example, where the processing system comprises a general-purpose processor configured using software, the general-purpose processor may be configured as respective different processing elements at different times. Software may accordingly configure the processing system to constitute a hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, later, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims. For example, the principles of the present invention are not limited to the illustrated central pivot irrigation systems but may be implemented in any type of irrigation system including linear move irrigation systems.

Having thus described various embodiments of the invention, what is claimed as new and desired to be protected by Letters Patent includes the following:

The invention claimed is:

1. A method of scheduling and coordinating applications of fertilizers, pesticides, and water on crops in a field, the method comprising:
   accessing data from an irrigation schedule with a processing system in communication with a control system of an irrigation system, the irrigation schedule including instructions for scheduling applications of water to the field;
   accessing data from a fertilizer schedule with the processing system;
   accessing data from a pesticide schedule with the processing system;
   determining with the processing system a coordinated water/fertilizer/pesticide application schedule that indicates when to apply water, fertilizers, and pesticides to the field based on the data from the irrigation schedule, the fertilizer schedule, and the pesticide schedule;
   receiving at the processing system location data representative of a location of the mobile irrigation system;
   receiving at the processing system location data representative of a location of a fertilizer applicator;
   receiving at the processing system location data representative of a location of a pesticide applicator;
   determining with the processing system when the fertilizer applicator may enter the field and apply fertilizers to the field based on the coordinated water/fertilizer/pesticide application schedule, the location of the mobile irrigation system, and the location of the pesticide applicator; and
   determining with the processing system when the pesticide applicator may enter the field and apply pesticides to the field based on the coordinated water/fertilizer/pesticide application schedule, the location of the mobile irrigation system, and the location of the fertilizer applicator.

2. The method as set forth in claim 1, wherein the fertilizer schedule includes data representative of a planned route of the fertilizer applicator in the field while applying fertilizers to the field.

3. The method as set forth in claim 1, wherein the pesticide schedule includes data representative of a planned route of the pesticide applicator in the field while applying pesticides to the field.

4. The method as set forth in claim 2, further comprising determining with the processing system whether the location of the fertilizer applicator or the planned route of the fertilizer applicator will interfere with operation of the mobile irrigation system; and instructing the fertilizer applicator to not enter the field or to exit the field if the processing system determines the location of the fertilizer applicator or the planned route of the fertilizer applicator will interfere with operation of the mobile irrigation system.

5. The method as set forth in claim 3, further comprising determining with the processing system whether the location of the pesticide applicator or the planned route of the pesticide applicator will interfere with operation of the mobile irrigation system; and instructing the pesticide applicator to not enter the field or to exit the field if the processing system determines the location of the pesticide applicator or the planned route of the pesticide applicator will interfere with operation of the mobile irrigation system.

6. The method as set forth in claim 1, further comprising determining with the processing system whether the fertilizer applicator and the pesticide applicator are likely to interfere with one another based on the location of the pesticide applicator and the location of the fertilizer applicator.

7. The method as set forth in claim 6, further comprising instructing the fertilizer applicator and the pesticide applicator to both stop if the processing system determines the fertilizer applicator and the pesticide applicator are likely to interfere with one another.

8. The method as set forth in claim 1, wherein the mobile irrigation system is a center pivot irrigation system or a lateral move irrigation system.

9. The method as set forth in claim 1, wherein the fertilizer schedule is stored in memory accessible by a control system of the fertilizer applicator.

10. The method as set forth in claim 1, wherein the pesticide schedule is stored in memory accessible by a control system of the pesticide applicator.

11. The method as set forth in claim 1, wherein the fertilizer applicator is an autonomous or semi-autonomous tractor, sprayer, spreader, or truck.

12. The method as set forth in claim 1, wherein the pesticide applicator is an autonomous or semi-autonomous tractor, sprayer, spreader, or truck.

13. The method as set forth in claim 1, wherein the processing system is incorporated in the control system of the irrigation system.

14. The method as set forth in claim 1, wherein the processing system and the control system of the irrigation system are mounted on the mobile irrigation system or mounted remotely from the mobile irrigation system.

15. An irrigation system comprising:
   a series of mobile towers each having wheels and a motor for driving the wheels;
   support structure for connecting the mobile towers to each other;
   a water-carrying conduit supported by the support structure;
   a plurality of water emitters connected to the conduit for delivering water to a ground surface;
   a plurality of valves for controlling water flow to the water emitters;
   a control system for controlling operation of the motors and the valves in accordance with an irrigation schedule to move the irrigation system over a ground surface and to apply selected amounts of fluids to the ground surface; and
   a processing system in communication with the control system, the processing system programmed to access data from the irrigation schedule;
receive data from a fertilizer schedule;
receive data from a pesticide schedule;
determine a coordinated water/fertilizer/pesticide application schedule that indicates when to apply water, fertilizers, and pesticides to the field based on the data from the irrigation schedule, the fertilizer schedule, and the pesticide schedule;
receive location data representative of a location of the mobile irrigation system;
receive location data representative of a location of a fertilizer applicator;
receive location data representative of a location of a pesticide applicator;
determine when the fertilizer applicator may enter the field and apply fertilizers to the field based on the coordinated water/fertilizer/pesticide application schedule, the location of the mobile irrigation system, and the location of the pesticide applicator; and
determine when the pesticide applicator may enter the field and apply pesticides to the field based on the coordinated water/fertilizer/pesticide application schedule, the location of the mobile irrigation system, and the location of the fertilizer applicator.

16. The irrigation system as set forth in claim 15, further comprising a wireless data transceiver coupled with the processing system for wirelessly receiving the fertilizer schedule, the location data from the fertilizer applicator, the data from the pesticide schedule, and the location data from the pesticide applicator.

17. The irrigation system as set forth in claim 15, wherein the processing system is incorporated in the control system of the irrigation system.

18. The irrigation system as set forth in claim 15, wherein the processing system and the control system of the irrigation system are mounted on the irrigation system or mounted remotely from the irrigation system.

19. The irrigation system as set forth in claim 15, wherein the fertilizer schedule includes data representative of a planned route of the fertilizer applicator in the field while applying the fertilizers to the field and the pesticide schedule includes data representative of a planned route of the pesticide applicator in the field while applying the pesticides to the field.

20. The irrigation system as set forth in claim 19, wherein the processing system is further configured to determine whether the location of the fertilizer applicator or the planned route of the fertilizer applicator will interfere with operation of the mobile irrigation system and instructs the fertilizer applicator to not enter the field or to exit the field if it determines the location of the fertilizer applicator or the planned route of the fertilizer applicator will interfere with operation of the mobile irrigation system.

21. The irrigation system as set forth in claim 19, wherein the processing system is further configured to determine whether the location of the pesticide applicator or the planned route of the pesticide applicator will interfere with operation of the mobile irrigation system and instructs the pesticide applicator to not enter the field or to exit the field if it determines the location of the pesticide applicator or the planned route of the pesticide applicator will interfere with operation of the mobile irrigation system.

* * * * *